United States Patent [19]

Shintani et al.

[11] Patent Number: 4,956,657
[45] Date of Patent: Sep. 11, 1990

[54] PHOTOGRAPHIC CAMERA

[75] Inventors: Dai Shintani; Toshihiko Taniguchi; Yukio Miki; Katsuhito Akagi; Hideo Kajita, all of Osaka, Japan

[73] Assignee: Minolta Camera Kabushiki Kaisha, Osaka, Japan

[21] Appl. No.: 352,262

[22] Filed: May 16, 1989

[30] Foreign Application Priority Data

May 16, 1988 [JP] Japan ................................ 63-119849

[51] Int. Cl.⁵ ............................................... G03B 1/18
[52] U.S. Cl. .................................. 354/195.12; 354/286
[58] Field of Search ..................... 354/400–409, 354/195.1, 195.12, 286; 350/255, 257

[56] References Cited

U.S. PATENT DOCUMENTS

| | | | |
|---|---|---|---|
| 4,449,807 | 5/1984 | Miki et al. | 354/195.1 |
| 4,534,621 | 8/1985 | Miki et al. | 350/257 |
| 4,536,071 | 8/1985 | Maekawa et al. | 354/286 X |
| 4,553,817 | 11/1985 | Ando et al. | 354/286 |
| 4,564,265 | 1/1986 | Miki | 354/286 X |

FOREIGN PATENT DOCUMENTS 59-140408 8/1984 Japan .

Primary Examiner—Brian W. Brown
Attorney, Agent, or Firm—Burns, Doane, Swecker & Mathis

[57] ABSTRACT

A photographic camera having a manual focusing mechanism, an automatic focusing mechanism for automatically moving a lens with a drive device and a clutch disposed between the drive device and the lens. The clutch is normally urged towards a state of engagement by an urging element. Also, the clutch may be maintained at its disengaged position against the urging force of the urging element by a locking mechanism. The locking mechanism is operatively connected with the drive device so as to be automatically released by a drive operation of the drive device.

10 Claims, 6 Drawing Sheets

PHOTOGRAPHIC CAMERA

BACKGROUND OF THE INVENTION

1. Field of the Invention

The present invention relates to a photographic camera having a manual focusing mechanism and an automatic focusing mechanism for moving a movable lens with a drive device.

2. Description of Related Arts

In a above-noted type of camera having a manual focusing mechanism and an automatic focusing mechanism, it is known to provide a transmitted unit with the lens and to provide a manually projectable and retractable transmitting unit with the drive device, with the tranmitted unit and the transmitting unit acting as a clutch together. In operation, when the transmitting unit is engaged with the transmitted unit of the lens, there is provided an automatic focusing mode controlled by an automatic focusing mechanism. On the other hand, when the transmitting unit is disengaged from the transmitted unit, there is provided a manual focusing mode controlled by a manual focusing mechanism.

However, with the above-described construction in which the transmitting unit is manually projected or retracted, two independent locking mechanisms are necessary to keep the transmitting unit and the transmitted unit engaged in the automatic focusing mode and disengaged in the manual focusing mode. Further, there must be provided an additional mechanism for manually releasing the respective lock mechanisms. As the result, the entire construction tends to be disadvantageouly complicated.

SUMMARY OF THE INVENTION

The primary object of the present invention is to improve the aforementioned type of photographic camera and to provide a photographic camera of a simpler construction which is easier to switch between the manual focusing mode and the automatic focusing mode.

In order to accomplish this object, a photographic camera related to the present invention includes: a lens movable along an optical axis; a manual lens moving mechanism for manually moving the lens; a drive device; an automatic lens moving mechanism for automatically moving the lens using a drive of the drive device and a clutch provided between the drive device and the lens; urging means for urging the clutch towards an engaged state; locking means for locking the clutch in a disengaged state against the urging force of the urging means; releasing means for releasing the locking means through operation of the drive of the drive device.

Also, in a photographic camera related to the present capable of selectively providing a manual lens moving mode, and an automatic lens moving mode through operation of a drive of a drive device, the camera includes: a clutch provided between the drive device and the lens; urging means for urging the clutch towards an engaged state; locking means for locking the clutch in a disengaged state against the urging force of the urging means; releasing means for releasing the locking means through operation of the drive of the drive device; wherein the clutch is engaged in the automatic lens moving mode and the clutch is disengaged in the manual lens moving mode.

With the above construction, in the manual mode, i.e. when the locking means maintains the disengaged condition of the clutch, if the drive device is energized the locking mechanism to permit will be automatically released the drive device to drive the manuable lens via the clutch, thereby moving the lens along an optical axis. Once it is engaged the clutch is maintained at its engagement by the urging force of the urging means.

As described above, the clutch provided in the power transmission between the drive device and the movable lens is urged towards engagement, and the drive of the drive device is effectively used to cause the locking means to release the clutch. This construction is simple yet permits an easy lens moving mode switchover operation, since the construction advantageously eliminates additional mechanisms for manually releasing the locking means and for maintaining the clutch at its engagement.

The foregoing and other objects, features and advantages of the invention will be apparent from the following, more particular description of preferred embodiments of the invention, as illustrated in the accompanying drawings.

BRIEF DESCRIPTION OF THE DRAWINGS

The accompanying drawings illustrate a photographic camera according to preferred embodiments of the present invention, in which.

DESCRIPTION OF THE PREFERRED EMBODIMENTS

Preferred embodiments of the present invention will be particularly described hereinafter with reference to the accompanying drawings.

A photographic camera in which the present invention is to be embodied is capable of detecting focus condition by using a light reflected from an object to be photographed which travels through a photographic lens. Also, this photographic lens is usable in an autofocus mode, in which the lens is driven by a motor based on the detected focus condition, and in a manual focus mode in which the lens is manually driven.

Figure 1:
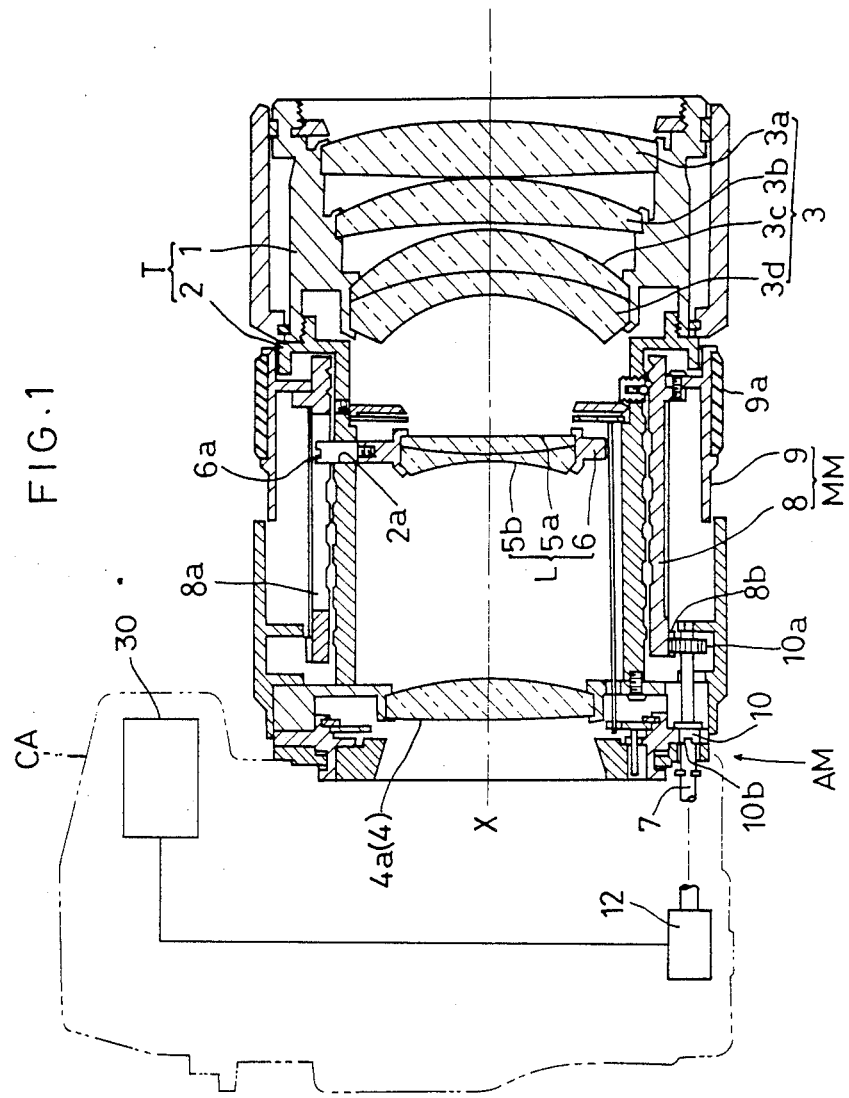
FIG. 1 is a side view in vertical section of a photographic camera according to one preferred embodiment of the invention.

As shown in FIG. 1, a lens barrel T includes a front lens barrel portion 1 and a rear lens barrel portion 2 operatively connected with each other. The front lens barrel portion 1 has fixedly mounted therein a front lens unit 3 having four lenses 3a, 3b, 3c and 3d, while the rear lens barrel portion 2 has fixedly mounted therein a rear lens unit 4 having a lens 4a. Further, in the rear lens barrel portion 2 between the front lens unit 3 and the rear lens unit 4, there is a movable lens L movable along an optical axis X.

The movable lens L includes a pair of lenses 5a and 5b, and is held by a lens holder 6. At an outer peripheral edge of the lens holder 6, there are fixedly screwed three guide pins 6a. The three guide pins 6a are inserted respectively into three cam grooves 2a defined in the peripheral face of the rear lens barrel portion 2, and are engaged with three straight grooves 8a in the peripheral face of a straight which is ring 8 rotatably supported about the rear lens barrel portion 2. The three straight grooves 8a are parallel to the optical axis X.

On one side of the straight ring 8, an operational ring 9 is screwed to the straight ring 8 so that they are movable together, and the operational ring 9 carries thereon a rubber ring 9a having a rugged outer peripheral surface. In a manual focusing operation, when the operational ring 9 is manually rotated, the movable lens L rotates therewith and moves along the optical axis X with the guidance of the cam grooves 2a and the straight grooves 108a. The above-described straight ring 8 and the operational ring 9 together constitute a manual focusing mechanism MM.

Figure 2:
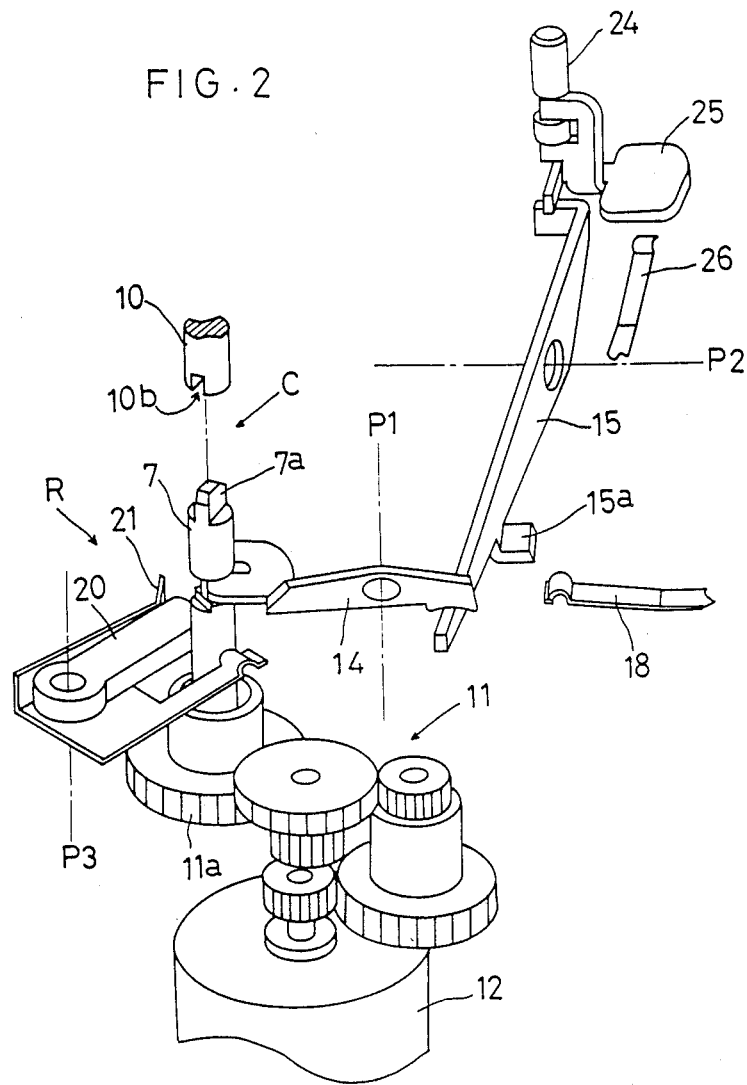
FIG. 2 is a perspective view showing a construction including a clutch provided between a drive shaft of a drive motor and an AF (autofocus) coupler, and an operational system of the clutch.

Next, an automatic focusing mechanism AM will be described. As shown in FIGS. 1, 2 and 3, at a rear end of the outer periphery of the straight ring 8, a gear portion 8b meshes with a coupler gear 10a of an AF coupler 10. Also, a motor is mounted on a camera body CA as a drive device 12 which is operatively connected with a drive gear 11a via a gear train 11. The drive gear 11a is fitted on a drive shaft 7 (coupler) having a projection 7a at a leading end thereof, and the gear 11a and the shaft 7 are coaxially slidable relative to each other and are rotatable there together. Also, as shown in FIG. 4, the drive shaft 7 is urged towards a projecting states by means of a spring 13 acting as engaging-direction urging means.

In the operation of the above-described construction, the drive shaft 7 is urged to allow its projection 7a to be engaged with a slot 10b in the AF coupler 10 allowing the motor 12 to rotate the straight ring 8, whereby an automatic focusing operation is carried out.

Figure 7:
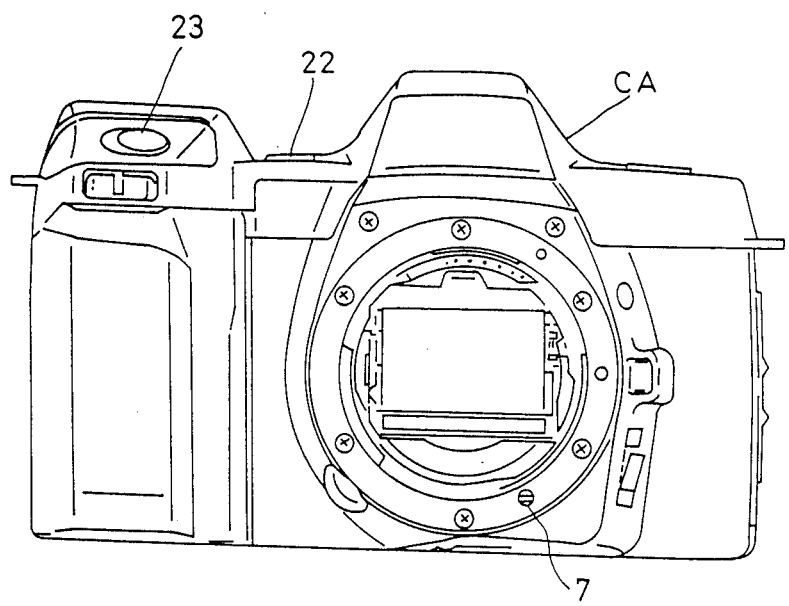
FIG. 7 is a front view showing the entirety of the photographic camera of FIG. 1 with its lens unit being detached therefrom.

Further, the drive shaft 7 is positioned as viewed from the front of the camera body CA illustrated in FIG. 7.

As shown in FIGS. 1 and 2, between the drive shaft 7 and the AF coupler 10, there is provided a clutch C which includes the projection 7a and the slot 10b. The clutch C is normally engaged by means of the spring 13. For declutching this clutch C (for a switchover to the manual focusing mode), as shown in FIGS. 2, 3 and 4, an end of a first arm 14 pivotable about an axis P1 is engaged on the drive shaft 7 across a recess 7b defined in the drive shaft 7, and an end of a second arm 15 pivotable about an axis P2 is placed in abutment against the other end of the first arm 14.

Figure 3A:
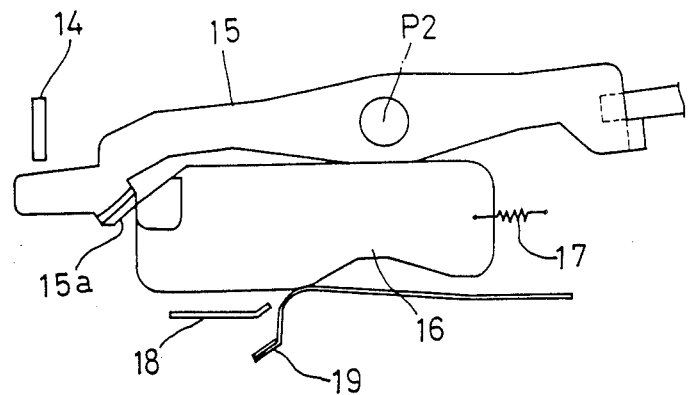
FIG. 3A is a side view showing the vicinity of an operational member for a second arm included in the clutch operating system.
Figure 3B:
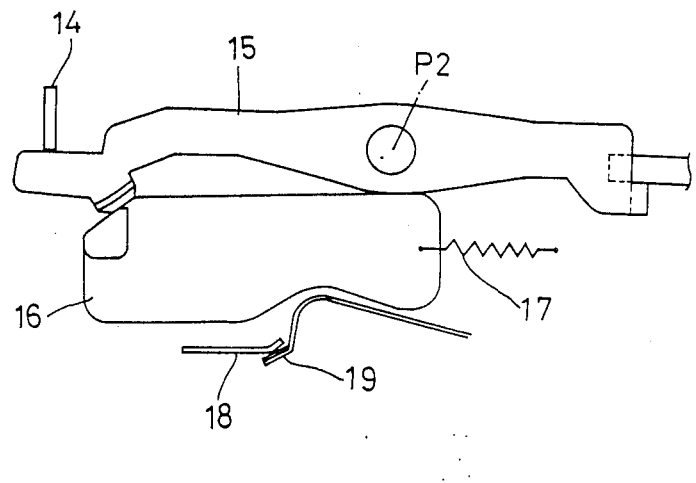
FIG. 3B is a side view showing the operational member of FIG. 3A when it has been slided leftwards.
Figure 4:
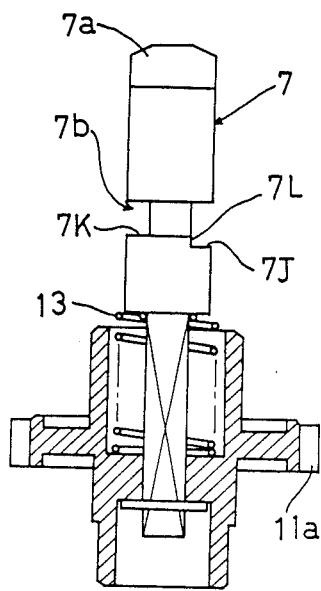
FIG. 4 is a side view in vertical section of the coupler and its vicinity.

Further, as shown in FIG. 3A, there is provided an operational member 16 which slidable leftwards in the drawing by means of an unillustrated external operating portion along the second arm 15, with the operational member 16 being biased away from the projection 15a of the second arm 15 by an urging force of a spring 17. In operation, if the operational member 16 is slid leftwards as illustrated in FIG. 3B to come into abutment against the projection 15a of the second arm 15, the second arm 15 is pivoted clockwise about the axis P2. Accordingly, the first arm 14 in abutment against the one end of the second arm 15 is rotated counterclockwise about the axis P1, and through the engagement between the other end of the first arm 14 and the drive shaft 7, the drive shaft 7 is slid away from the AF coupler 10.

With the above sliding operation of the operational member 16, a switch plate 18 comes into contact with a terminal 19, and a signal is inputted to an unillustrated control device. This signal indicates switch over of the focus mode from the autofocus mode to the manual focus mode, and the operational member 16 returns to its home position by the urging force of the spring 17.

Next, described a locking mechanism R for locking the drive shaft 7 at a position away from the AF coupler 10 will be describe. As shown in FIG. 2, an engaging arm 20 is supported pivotable about an axis P3, with the arm 20 being urged towards the drive shaft 7 by means of a plate spring 21. Also, as shown in FIG. 3, the drive shaft 7 the recess 7b which forms a first face 7K and a second face 7J at different axial positions on the drive shaft 7.

In operation, when the drive shaft 7 is slid away from the AF coupler 10, the engaging arm 20 engages the recess 7b and thereby locks the drive shaft 7 at this position.

The motor 12 is deenergized in the above condition (manual focus mode). However, if the operational member 16 is again slid to bring the switch plate 18 into contact with the terminal 19 to generate a signal to the control device, or if a program set button 22 shown in FIGS. 6 and 7 is manually depressed to generate a signal to the control device, the focus mode is switched over to the autofocus mode from the manual focus mode.

Figure 5A:
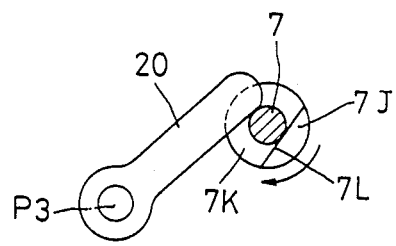
FIGS. 5A, 5B and 5C are sectional plane views stepwisely illustrating conditions in which an engaging arm of a locking mechanism is engaged on the drive shaft and then disengaged therefrom.
Figure 5B:
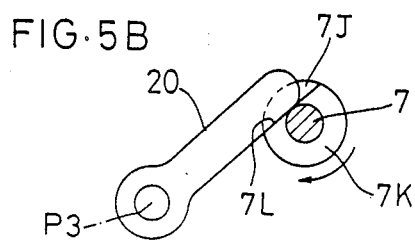
Figure 5C:
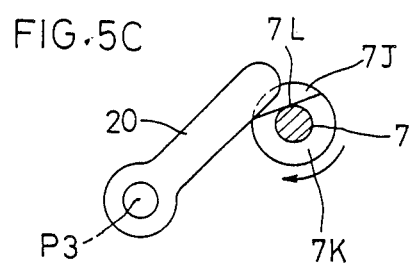
Figure 6:
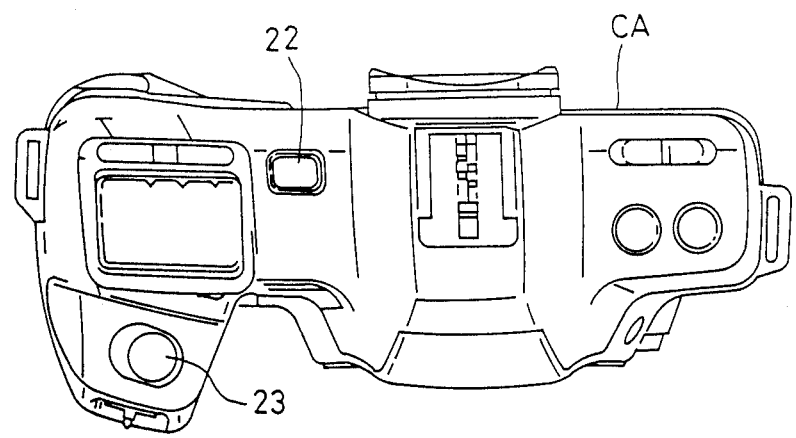
FIG. 6 is a plane view showing the entirety of the photographic camera of FIG. 1 with its lens unit being detached therefrom.

More particularly, with the depressing operation of the shutter release button 23 of FIGS. 6 and 7, a focus detecting device 30 detects a focus condition of a photographic subject, and the motor 12 is driven in accordance with the detected focus condition, thereby rotating the drive shaft 7. Then, supposing the engaging arm 20 is currently placed on the first face 7K of the drive shaft 7 as illustrated in FIG. 5A, the clockwise rotation of the drive shaft 7 moves the engaging arm 20 from the first face 7K to the second face 7J as illustrated in FIG. 5B, and the drive shaft 7 is projected towards the AF coupler 10 by an amount equivalent to the step difference between the first and second faces 7K and 7J. With further rotation of the drive shaft 7, as illustrated in FIG. 5C, one edge of a side face 7L between the first face 7K and the second face 7J pushes the engaging arm 20 off the second face 7J, whereby the drive shaft 7 is projected by the spring 13 to come into engagement with the AF coupler 10. The above-described first face 7K, second face 7J and the side face 7L of the drive shaft 7 together constitute a release mechanism for the locking mechanism R.

Further, as shown in FIG. 2, the second arm 15 carries at the other end thereof a lock pin 24 for locking engagement between the lens and the camera body CA, and a lens lock button 25 for releasing the locked condition of the lock pin 24. In operation, if the lens lock button 25 is manually depressed to cause the pin 24 to release the locked condition, the second arm 15 is pivoted to move the drive shaft 7 away from the AF coupler 10 and the drive shaft is locked by the engaging arm 20, and this operation is detected by a switch 26.

ALTERNATE EMBODIMENT

Figure 8:
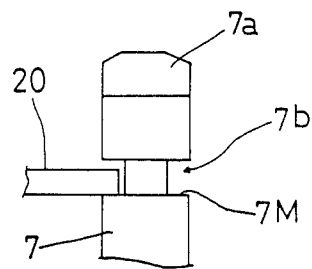
FIG. 8 is a side view showing the coupler and its vicinity according to another embodiment of the invention.

In the arrangement between the drive shaft 7 and the engaging arm 20, an alternative arrangement is possible as shown in FIG. 8. In this arrangement, the recess 7b of the drive shaft 7 defines only one face 7M. In operation, this face 7M comes into frictional contact with the engaging arm 20 to push the arm 20 outwards with the rotation of the drive shaft 7.

Figure 9:
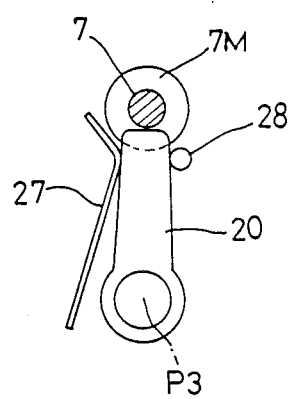
FIG. 9 is a sectional plane view showing an embodiment of a plate spring and a stopper included in the coupler embodiment of FIG. 8.
Figure 10:
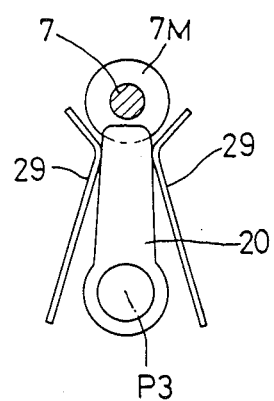
FIG. 10 is a sectional plane view showing another embodiment of the plate spring included in the coupler embodiment of FIG. 8.

In this alternate arrangement, as shown in FIG. 9, it is conceivable to provide a plate spring 27 for urging the engaging arm 20 towards its engaging side and a stopper 28 for fixedly positioning the engaging arm 20. Or, as shown in FIG. 10, it is also conceivable to provide a pair of plate springs 29 for sandwiching the engaging arm 20. In the construction of FIG. 9, the drive shaft 7 must be rotated clockwise to disengage the engaging arm 20. Whereas, in the construction of FIG. 10, the drive shaft 7 may be rotated in either direction for the same purpose.

Incidentally, the present invention may be applied not only to the above-described focusing mechanism, but also to a moving mechanism for a zoom lens.

What is claimed is:

1. A photographic camera comprising:
    a lens movable along an optical axis;
    a manual lens moving mechanism for manually moving said lens;
    a drive device;
    an automatic lens moving mechanism for automatically moving said lens using a drive of said drive device and including a clutch provided between said drive device and said lens;
    urging means for urging said clutch towards an engaged state;
    locking means for locking said clutch in a disengaged state against the urging force of said urging means; and
    releasing means for releasing said locking means through operation of the drive of said drive device.

2. In a photographic camera capable of selectively providing a manual lens moving mode for manually moving a lens movable along an optical axis and an automatic lens moving mode for automatically moving the lens, an automatic lens moving mechanism comprising:
    a drive device including a drive for automatically moving said lens;
    a clutch provided between said drive device and said lens;
    urging means for urging said clutch toward an engaged state;
    locking means for locking said clutch in a disengaged state against the urging force of said urging means; and
    releasing means for releasing said locking means through operation of the drive of said drive device;
    wherein the clutch is engaged in the automatic lens moving mode and the clutch is disengaged in the manual lens moving mode.

3. A photographic camera capable of selectively providing a manual lens moving mode for manually moving a lens movable along an optical axis and an automatic lens moving mode for automatically moving the lens, the camera comprising:
    a drive device including a drive for automatically moving said lens;
    a clutch provided between said drive device and said lens;
    first maintaining means for maintaining said clutch at an engaged position thereof;
    second maintaining means for maintaining said clutch at a disengaged position thereof; and
    releasing means for releasing said second maintaining means through operation of said drive of said drive device;
    wherein the clutch is engaged in the automatic lens moving mode and the clutch is disengaged in the manual lens moving mode.

4. A photographic camera as defined in claim 3, further comprising:
    focus detecting means for detecting a focus condition of a photographic subject;
    wherein, in the automatic lens moving mode, said lens is moved through operation of the drive of said drive device to an in-focus position in accordance with the condition detected by said focus detecting means.

5. A photographic camera as defined in claim 3, wherein said first maintaining means includes urging means for urging said clutch towards said engaged position.

6. A photographic camera as defined in claim 5, wherein said second maintaining means includes a locking mechanism for locking said clutch at said disengaged position against the urging force of said urging means.

7. A photographic camera as defined in claim 6, wherein said releasing means includes a release mechanism for releasing said locking mechanism through operation of the drive of said drive device.

8. A photographic camera as defined in claim 1, wherein said clutch includes a driving shaft connected to said drive device, and a driven shaft connected to said lens, said driven shaft being driven by said driving shaft to move said lens when said clutch is in said engaged state.

9. A photographic camera as defined in claim 2, wherein said clutch includes a driving shaft connected to said drive device, and a driven shaft connected to said lens, said driven shaft being driven by said driving shaft to move said lens when said clutch is in said engaged state.

10. A photographic camera as defined in claim 3, wherein said clutch includes a driving shaft connected to said drive device, and a driven shaft connected to said lens, said driven shaft being driven by said driving shaft to move said lens when said clutch is in said engaged state.

* * * * *